(12) United States Patent
Zhu et al.

(10) Patent No.: US 9,756,645 B2
(45) Date of Patent: Sep. 5, 2017

(54) ENB, UE AND METHOD FOR PHYSICAL RESOURCE BLOCK ALLOCATION IN MTC UE

(71) Applicant: Intel IP Corporation, Santa Clara, CA (US)

(72) Inventors: Yuan Zhu, Beijing (CN); Fangze Tu, Beijing (CN); Seunghee Han, Cupertino, CA (US); Gang Xiong, Beaverton, OR (US); Xiaogang Chen, Beijing (CN); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 117 days.

(21) Appl. No.: 14/573,356

(22) Filed: Dec. 17, 2014

(65) Prior Publication Data

US 2015/0264693 A1 Sep. 17, 2015

Related U.S. Application Data

(60) Provisional application No. 61/953,617, filed on Mar. 14, 2014.

(51) Int. Cl.
*H04W 72/04* (2009.01)
*H04W 4/00* (2009.01)
(Continued)

(52) U.S. Cl.
CPC ....... *H04W 72/0493* (2013.01); *H04L 5/0053* (2013.01); *H04W 4/005* (2013.01); *H04W 72/0446* (2013.01); *H04W 72/1252* (2013.01)

(58) Field of Classification Search
CPC .... H04L 5/00; H04W 4/005; H04W 72/0446; H04W 72/0493; H04W 72/1252
(Continued)

(56) References Cited

U.S. PATENT DOCUMENTS

| 2009/0207797 A1* | 8/2009 | Shen | H04L 5/0053 370/329 |
| 2011/0171985 A1* | 7/2011 | Papasakellariou | H04W 72/02 455/509 |

(Continued)

FOREIGN PATENT DOCUMENTS

| JP | 2013157699 A | 8/2013 |
| KR | 1020130086990 A | 8/2013 |

(Continued)

OTHER PUBLICATIONS

"International Application Serial No. PCT/US2015/019702, International Search Report mailed May 28, 2015", 3 pgs.

(Continued)

*Primary Examiner* — Chi H Pham
*Assistant Examiner* — Robert Lopata
(74) *Attorney, Agent, or Firm* — Schwegman Lundberg & Woessner, P.A.

(57) ABSTRACT

Embodiments allow an eNBs and a target UE to both calculate which resource block groups (RBGs) to use to transmit data. Because the RBGs that will contain information of interest can be pre-calculated, there is no need to receive and store all RBGs in the transmitted signal before decoding the signal and identifying which RBGs are of interest to the recipient. This allows receivers to buffer and/or store only those RBGs that will contain received information and discard others. The amount of information that needs to be stored and/or buffered thus is less and can result in receivers with less memory and, hence, lower cost. In order to calculate which RBGs are to be used to transmit and/or receive information, a logical RBG index is first calculated and the logical RBG index is mapped to a physical RBG index.

27 Claims, 6 Drawing Sheets

(51) Int. Cl.
*H04W 72/12* (2009.01)
*H04L 5/00* (2006.01)

(58) Field of Classification Search
USPC .......................................... 370/310, 328, 329
See application file for complete search history.

(56) References Cited

U.S. PATENT DOCUMENTS

| | | | |
|---|---|---|---|
| 2012/0195267 A1 | 8/2012 | Dai et al. | |
| 2014/0050190 A1* | 2/2014 | Shimezawa | H04L 5/0023 370/329 |
| 2014/0153524 A1* | 6/2014 | Xu | H04L 5/0044 370/329 |
| 2015/0208387 A1* | 7/2015 | Awad | H04W 72/042 370/329 |
| 2015/0264718 A1* | 9/2015 | Yu | H04W 72/02 370/329 |
| 2015/0319772 A1* | 11/2015 | Halabian | H04W 72/1273 370/329 |
| 2015/0341951 A1* | 11/2015 | Sun | H04W 72/1273 370/330 |
| 2016/0242207 A1* | 8/2016 | Yasukawa | H04W 72/042 |

FOREIGN PATENT DOCUMENTS

| | | |
|---|---|---|
| KR | 1020130107855 A | 10/2013 |
| WO | WO-2013024967 A2 | 2/2013 |
| WO | WO-2015138446 A1 | 9/2015 |

OTHER PUBLICATIONS

"International Application Serial No. PCT/US2015/019702, Written Opinion mailed May 28, 2015", 6 pgs.

"Evolved Universal Terrestrial Radio Access (E-UTRA); Physical layer procedures", ETSI TS 136 213 V11.3.0 (3GPP TS 36.213 version 11.3.0 Release 11). LTE., (Jul. 2013), 178 pgs.

"Study on provision of low-Cost MTC UEs based on LTE", 3GPP TR 36.888 v2.1.1 Technical Specification Group Radio Access Network, Release 12, (Jun. 2013), 55 pgs.

Baker, Mathew, "LTE-Advanced Physical Layer: REV-090003r1", IMT-Advanced Evaluation Workshop (Beijing), (Dec. 2009), 48 pgs.

Zyren, Jim, "Overview of the 3GPP Long Term Evolution Physical Layer", Freescale Semiconductor Rev.0, [Online]. Retrieved from the Internet: <URL: http://www.freescale.com/files/wireless_comm/doc/white_paper/3GPPEVOLUTIONWP.pdf>, (Jul. 2007), 27 pgs.

* cited by examiner

ENB, UE AND METHOD FOR PHYSICAL RESOURCE BLOCK ALLOCATION IN MTC UE

PRIORITY CLAIM

This application claims the benefit of priority under 35 U.S.C. 119(e) to U.S. Provisional Patent Application Ser. No. 61/953,617, filed 14 Mar. 2014, entitled "PRB Resource Allocation in Low Cost MTC UE," which is incorporated herein by reference in its entirety.

TECHNICAL FIELD

Embodiments pertain wireless communications and more specifically allocating resource blocks for user equipment that use machine type communications. Some embodiments relate to cellular networks, including networks operating in accordance with one or more of the 3GPP LTE standards.

BACKGROUND

Machine type communications (MTC) differ from human-to-human communications in that they generally have a low data rate, and are more delay tolerant. MTC User Equipment (UE) are used in many applications where power is a concern and where costs of the UE is also a concern.

DETAILED DESCRIPTION

Figure 1:
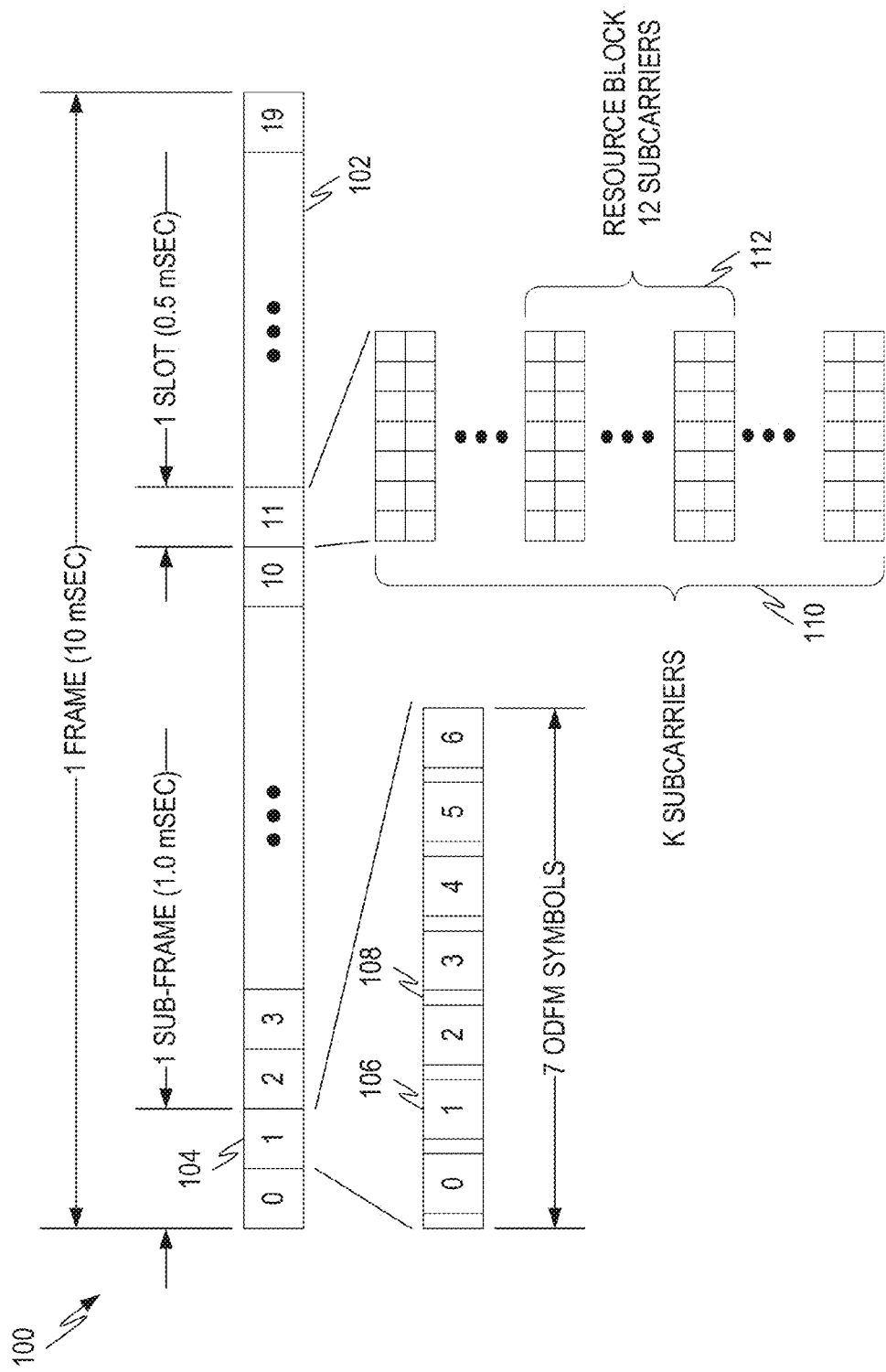
FIG. 1 illustrates a representative signal of a representative wireless network in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Different methods to support MTC UEs on cellular networks such as 3GPP ($3^{rd}$ Generation Partnership Project) LTE (Long Term Evolution) networks, have been discussed and proposed. MTC UEs are often employed in situations where cost is an important consideration. However, the complexity of the LTE signaling structure imposes certain hardware and/or software requirements on MTC UEs that not only increase costs, but also are not important to the support of the MTC UE due to the difference in MTC behavior vs a human-to-human communications on a UE.

Embodiments disclosed herein propose a scheme where both the eNB and UE pre-calculate which resource blocks (e.g., time and/or frequency slots) will be used for communication. The primary description herein is for communications from the eNB to the UE such as over the Physical Downlink Shared Channel (PDSCH) and/or Physical Downlink Control Channel (PDCCH). Also, the primary focus is for MTC UE due to the unique characteristics such as lower data requirements and delay tolerance, although principles herein could be applied to non-MTC UE under certain circumstances. Because the UE knows which blocks contain information transmitted from the UE to the eNB before decoding (and/or even before reception), it can ignore and/or discard data not in the designated blocks. This can reduce the hardware requirements of the receiver for MTC UEs since they only need to save and/or buffer the data in the designated blocks (as well as any control and/or other necessary information). Thus, they do not need to store and/or buffer as much data.

In some embodiments, the eNB and UE calculate which resource blocks will be used by first calculating a logical resource block index and then mapping the logical resource block index onto the appropriate number of physical resource blocks. In many embodiments, the logical resource block index and mapping function uses Resource Block Groups (RBGs) rather than individual physical resource blocks.

The logical resource block index can be based on the number of RBGs needed to transmit information, the number of RBG subsets of that size and a Radio Network Temporary Identifier (RNTI) such as a Cell Radio RNTI (C-RNTI), a Random Access RNTI (RA-RNTI) or a Paging RNTI (P-RNTI). In some embodiments the RNTI used can vary over time (such as a time varying RNTI) so that the logical resource block index also varies over time. In this manner, collisions between UE that occur at one moment in time will not likely occur at another moment in time. One way to make the RNTI time varying is to calculate the index a function of both an RNTI and time. Time can be expressed in a variety of ways such as a radio frame, a radio subframe, or a slot.

A mapping function is then used to map the logical resource block index to physical RBGs in order to identify the physical RBGs used to transmit and/or receive information. In some embodiments the mapping function results in contiguous allocation of physical RBGs and in some embodiments the mapping function results in physical RBGs that are not contiguous. In some embodiments logic is used to select a mapping function to use while in other embodiments a pre-determined, pre-arranged, or pre-agreed mapping function is used.

FIG. 1 illustrates a representative signal 100 of a representative wireless network. The representative signal 100 is representative of the LTE frame structure under either a Time Division mode (TDD) or Frequency Division mode (FDD). The building block of LTE is a physical resource block (PRB) and all of the allocation of the LTE PRBs is normally handled by a scheduling function at the eNB. For the present invention, however, the PRBs used to communicate with MTC UEs are calculated using a set of information known to both the eNB and the UE so that both the eNB and the UE can calculate which PRBs will be used to communicate with the UE.

In an LTE network, transmissions are segmented into frames. A frame 102 is 10 msec. in duration. Frames consist of 20 slot periods 104 of 0.5 msec. each. Sub-frames consist of two slots and are 1.0 msec. in duration. Each slot consists of 7 ODFM symbols 106, with each ODFM symbol having a cyclic prefix 108.

The LTE specification is designed to accommodate bandwidths from 1.25 MHz to 20 MHz. Thus, the number of subcarriers in a slot is dependent on the total bandwidth. This, in a given slot, there may be K subcarriers 110, where K is dependent on the bandwidth. A resource block (e.g. PRB) 112 generally has 12 subcarriers and is one slot in duration.

Several consecutive PRBs constitute a Resource Block Group (RBG) and resource allocation is done in units of RBGs. The allocation of RBGs to a certain UE do not need to be adjacent to each other, which provides frequency diversity. The RBG size, P, is the number of PRBs in each RBG and depends on the bandwidth. Table 1 below illustrates the relationship between the number of PRBs, N, and the RBG size, P.

TABLE 1

RBG Size vs. Number of PRB

| Number of PRB ($N_{PRB}$) | RBG Size (P) |
|---|---|
| ≤10 | 1 |
| 11-26 | 2 |
| 27-63 | 3 |
| 64-110 | 4 |

Figure 2:
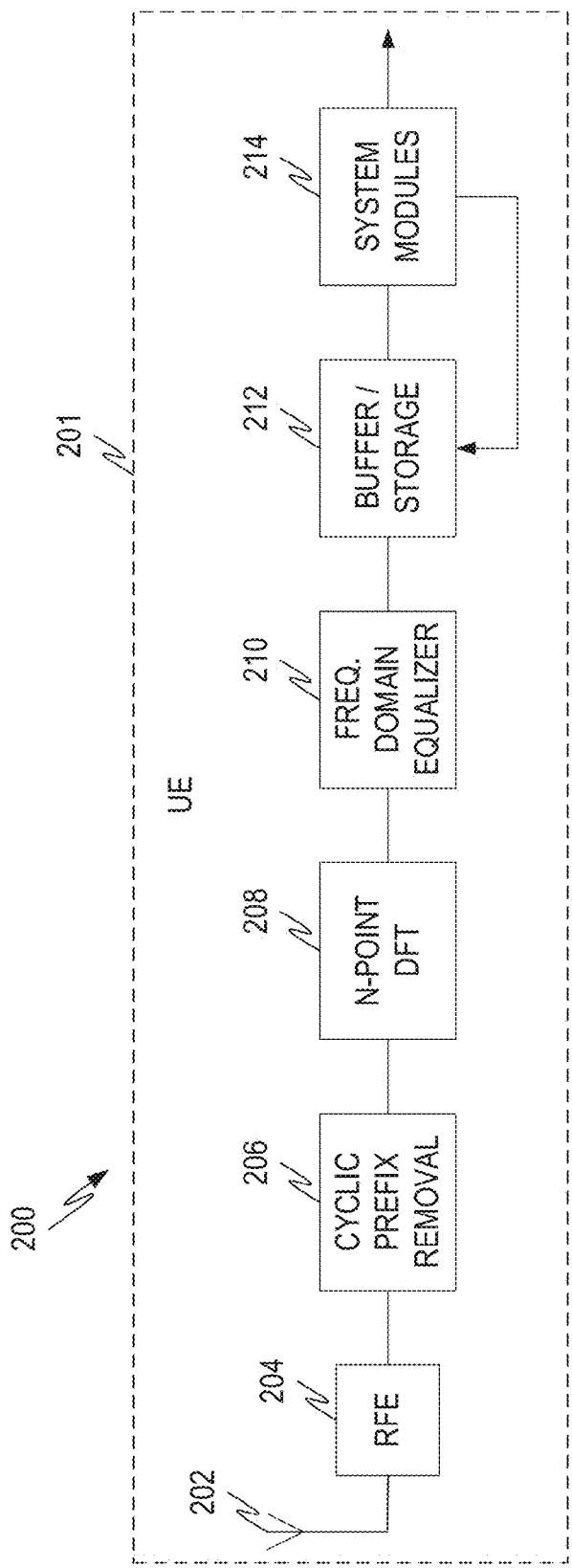
FIG. 2 illustrates a representative receiver to receive the representative signal of FIG. 1 in accordance with some embodiments.

FIG. 2 illustrates a representative receiver 200 of a UE 201 to receive the representative signal of FIG. 1. The receiver 200 has at least one antenna 202 coupled to a receiver front end 204 that detects the presence of a signal and mixes the signal to baseband and performs sampling and digitization of the incoming signal. The cyclic prefix removal block 206 removes the cyclic prefixes used for the symbols. After reception and cyclic prefix removal, the receiver performs a discrete Fourier transform using to recover the frequency domain information as indicated by DFT block 208. The receiver may then perform frequency domain equalization as indicated by block 210. At this point, the appropriate information is buffered in buffer 212 and sent to system modules 214, which recover the information of interest to the UE 201.

As previously discussed, if the UE 201 understands which RBGs are allocated to it and, thus, used to transmit information to the UE 201 from the eNB, the UE 201 only need retain and/or buffer those RBGs where information of interest resides. This can reduce the buffer size for a UE 201 using a mechanism, such as those disclosed herein, which allows the UE 201 to calculate which RBGs are going to be used to communicate information to the UE.

In FIG. 2, the system modules 214 calculate the RBGs that will be used to communicate information to the UE 201 and the control signal 216 represents the system retaining in buffer 212 only those RBGs of interest to the UE 201. Note the RBGs of interest to the UE 201 can include not only those RBGs calculated to contain relevant information but other RBGs which may contain, for example, control or other information of interest to the UE 201.

Figure 3:
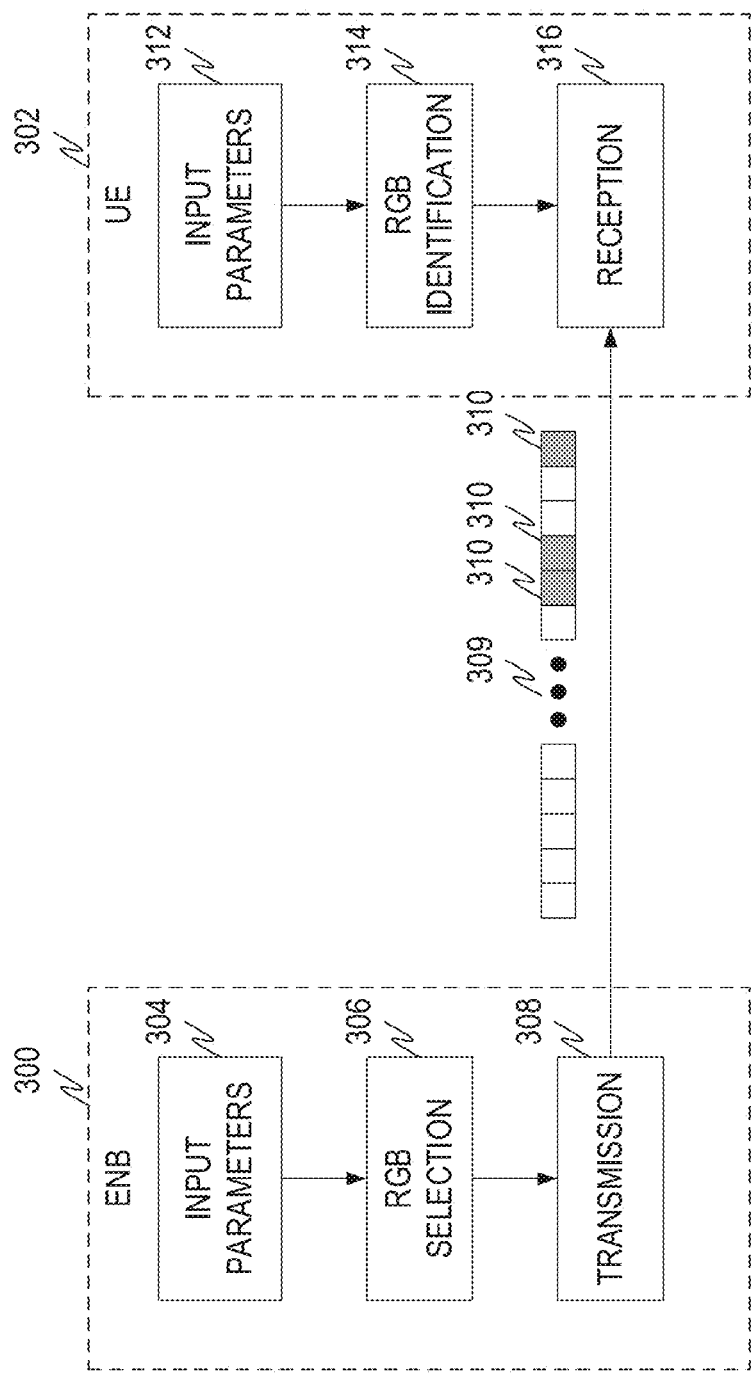
FIG. 3 illustrates an example communication between an enhanced Node B (eNB) and a User Equipment (UE) in accordance with some embodiments.

FIG. 3 illustrates an example communication between an eNB 300 and a UE 302. The eNB 300 can use the following when communicating with an MTC UE and use "normal" procedures when communicating with other UE. Thus, a first step (not shown) might be to identify which type of UE is being communicated with and if it is a MTC UE (or other UE that uses the described procedure) proceed as described. In the method below, communication is from the eNB 300 to UE 302 such as over the PDSCH and/or PDCCH channels. Thus, the parameters (such as number of RBGs and so forth) refer to those parameters in the channel being utilized.

The eNB 300 first identifies the input parameters needed to calculate which RBGs will be used to communicate to UE 302. As discussed in conjunction with FIG. 4 below, the input parameters can include one or more of the following in any combination:

1) The total number of RBGs available in the bandwidth ($N_{RBG}$).

2) The maximum number of PRBs that are allocated to a UE ($PRB_{max}$).

3) The RBG size (P). P represents the number of PRBs per RBG and is defined, for example, in the specification 3GPP TS 36.213 V11.3.0 (hereinafter TS 36.213), and is reproduced in Table 1 herein.

4) An RNTI of the UE 302.

5) A time metric such as a radio frame, a subframe, a slot, or other time metric.

The input parameters are used to calculate the RBGs that will be used to communicate with UE 302 and indicated by RBG selection block 306. Details of how the input parameters are used to calculate RBGs used to communicate with a UE are discussed in conjunction with FIG. 4 below.

Finally the information needed is transmitted on the selected RBGs as indicated by transmission block 308. The transmitted signal is illustrated by 309 with the calculated RBGs indicated by 310.

Since UE 302 has access to the same input parameters and eNB 300, UE 302 can also calculate the RBGs in the same manner and using the same method as eNB 300. Thus, the UE 302 obtains the input parameters as indicated in block 312. As discussed in conjunction with FIG. 5 below, the input parameters can include one or more of the following in any combination:

1) The total number of RBGs available in the bandwidth ($N_{RBG}$).

2) The maximum number of PRBs that are allocated to a UE ($PRB_{max}$).

3) The RBG size (P). P represents the number of PRBs per RBG and is defined, for example, in the specification 3GPP TS 36.213 V11.3.0, and is reproduced in Table 1 herein.

4) An RNTI of the UE 302.

5) A time metric such as a radio frame, a subframe, a slot, or other time metric.

The UE 302 then identifies the RBGs that will have information of interest such as information sent by eNB 300 to UE 302 in block 314. The UE 302 then receives the signal, keeping the information in at least a subset of the identified RBGs. Additionally, or alternatively, the UE 302 can also keep information in RBGs that contain control information or other information of interest.

Figure 4:
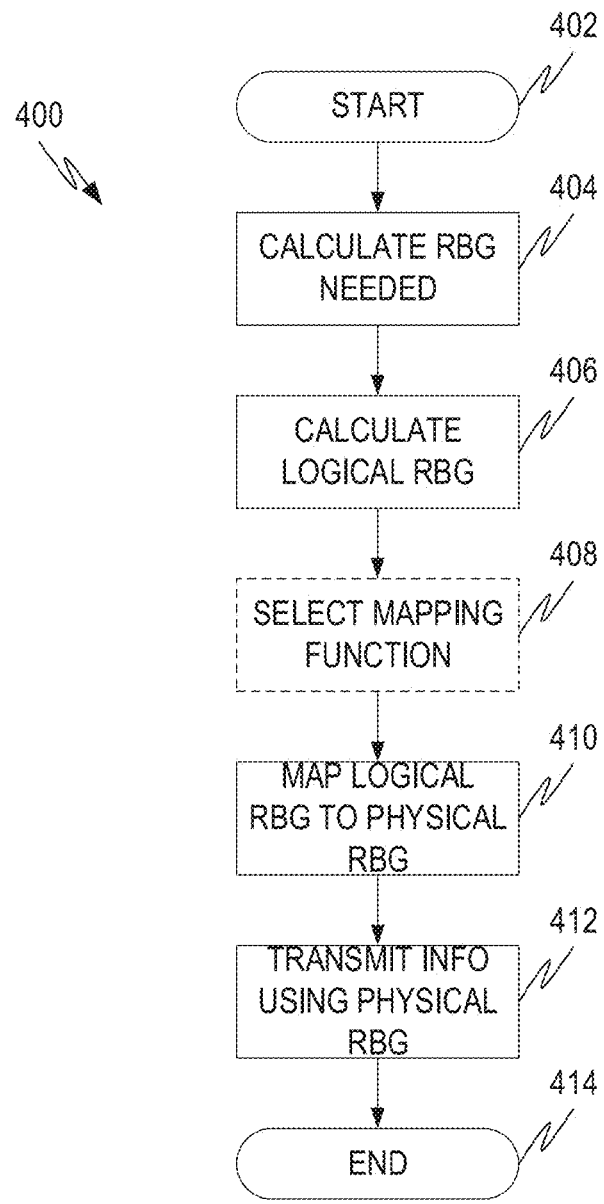
FIG. 4 illustrates an example flow diagram implemented by an eNB to select Resource Block Groups (RBG) to communicate with a UE in accordance with some embodiments.

FIG. 4 illustrates an example flow diagram 400 implemented by an eNB in some embodiments to select Resource Block Groups (RBG) to communicate with a UE, such as over PDSCH and/or PDCCH. The method illustrated in FIG. 4 begins at operation 402 and proceeds to operation 404 where the eNB calculates is the number of RBG subsets that are available for an eNB to transmit the information to a MTC UE or other appropriate UE. This subset is calculated by the relationship:

$$RBG_{SUB} = \left\lfloor \frac{N_{RBG}}{RBG_{NEED}} \right\rfloor \qquad (1)$$

where:
$RBG_{SUB}$ is the number of RBG subsets that are available for an eNB to transmit the information to a MTC UE,
$N_{RBG}$ is total number of RBGs available in the system bandwidth,
$RBG_{NEED}$ is the number of RBGs needed to transmit the maximum PRBs allocated to MTC UEs, and
$\lfloor \blacksquare \rfloor$ is the "floor" operator that yields the largest integer that is not greater than the argument (e.g., 1.9 would be set to 1).

$N_{RBG}$ is specified by the number of PRBs (which is related to the bandwidth) and the RBG size and can be calculated by dividing the number of PRBs by the RBG size and applying the ceiling operator to the result. For example, if the number of PRBs is 110 and the RBG size is 4, then the $N_{RBG} = \lceil 110/4 \rceil = 28$.

$RBG_{NEED}$ is calculated based on the number of RBGs needed to transmit the maximum PRBs allocated to MTC UEs ($PRB_{max}$). In other words:

$$RBG_{NEED} = \left\lceil \frac{PRB_{max}}{P} \right\rceil \qquad (2)$$

where:
$PRB_{max}$ is the maximum allocated PRBs for an MTC UE,
P is the RBG size, e.g., from Table 1 and/or TS 36.213, and
$\lceil \blacksquare \rceil$ is the "ceiling" operator that yields the smallest integer that is not less than the argument (e.g., 1.1 would be set to 2).

In general, $PRB_{max}$ will be specified by a standard, set by an entity (such as the eNB, or other core network entity) and sent to the UE, and/or agreed to by the UE and eNB in some fashion. In one embodiment, $PRB_{max}$ is set to five. In another embodiment, $PRB_{max}$ is set to six. In other embodiments $PRB_{max}$ is set to some other value.

Once the total number of RBG subsets ($RBG_{SUB}$) is calculated as specified above, the eNB calculates the logical RBG index ($I_{RBG}$) in operation 406. The logical RBG index can be calculated based on an RNTI and the total number of RBG subsets. For example:

$$I_{RBG} = \text{RNTI} \bmod RBG_{SUB} \qquad (3)$$

where:
RNTI is an RNTI for the target UE, such as a C-RNTI, P-RNTI, RA-RNTI, a time varying RNTI, or so forth, and $RBG_{SUB}$ is the total number of RBG subsets as calculated in equation (1) above.

If UEs with the sane RNTI are served by two different eNBs, such as when a small cell eNB and macro cell eNB each serves one UE, and if both eNBs use the same RNTI for its UE, the two eNBs will calculate the same logical RBG index and will attempt to send information on the same mapped RBGs. To reduce the probability of inter-cell interference, some embodiments introduce the physical cell ID into the function, so that the RNTI used in the calculation of $I_{RBG}$ is the sum of the RNTI and the cell ID. This way, the different cell IDs for the two eNBs will result in different $I_{RBG}$ calculated for the two different eNBs. Thus, the equation for $I_{RBG}$ will be:

$$I_{RBG} = (\text{RNTI} + \text{Cell ID}) \bmod RBG_{SUB}. \qquad (3a)$$

Rather than an RNTI that does not vary over time, some embodiments use a time varying RNTI. The calculation of a time varying RNTI ($RNTI_k$) can be accomplished using the output of a pseudorandom function that takes an RNTI (e.g., C-RNTI, P-RNTI, RA-RNTI, etc.) and a time metric as an input and outputs the appropriate length time varying RNTI. One procedure to calculate a time varying RNTI ($RNTI_k$) is already specified in 3GPP TS 36.213 V11.0.0, section 9.1 as:

$$RNTI_k = A * RNTI_{k-1} \bmod D \qquad (4)$$

where:
A=39827,
D=65537, and
k represents a time metric, such as a radio frame, subframe, slot, etc. In other words, calculate a new $RNTI_k$ for the $k^{th}$ radio frame, subframe, slot, etc.

$RNTI_0$ should not equal to zero, so if $RNTI_0$ is zero based on a selection criteria, the $RNTI_0$ should be modified to be non-zero according to a procedure that both the eNB and UE uses. This can be as simple as setting $RNTI_0$ to be equal to one or some other value (such as the Cell ID) when $RNTI_0$ comes up as zero. As explained above, if UEs with the same RNTI are served by two different eNBs, setting $RNTI_0$ equal to RNTI+Cell ID can help to reduce the probability of inter-cell interference. In addition, when it is desired to use the cell ID, such as by using equation (3a) instead of equation (3), embodiments need not necessarily add the cell ID to each iteration of the time varying $RNTI_k$. In some embodiments, $RNTI_0$ is set to RNTI+Cell ID and the iteration for $RNTI_k$ proceeds from there using equation (3) instead of (3a). In other words, for the first iteration ($RNTI_0$) equation (3a) is used and subsequent to the first iteration, equation (3) is used.

Returning to FIG. 4, after the logical RBG index ($I_{RBG}$) is calculated in operation 406, the eNB will then map the logical RBG index to a sequence of physical RBGs to identify which physical RBGs will be used to send data. The mapping can be accomplished by a number of different functions. In some embodiments, the eNB can select one mapping function from among different mapping functions based on some parameter(s) and/or logic known to both the eNB and target UE. Any such selection is represented by operation 408. As one example, the UE can initially be set to use a default mapping. Once the connection is setup, the eNB can use Radio Resource Control (RRC) signaling to configure the UE to use a different mapping function. As a further example, in some embodiments the default mapping used by a UE is a mapping that results in allocated RBGs to be distributed in frequency. In other embodiments a different default mapping is used. In some embodiments, only one mapping function is used so operation 408 is not performed.

After the mapping function is selected (for those embodiments that employ selection logic) or after the logical RBG index is calculated (for those embodiments that do not employ selection logic), the mapping is performed by operation 410 according to a mapping function. The following represent examples of mapping functions that can be used to map the logical RBG index ($I_{RBG}$) to physical RBGs. As explained above, some embodiments use logic to identify one mapping function to use in operation 410 while other embodiments use a pre-defined or pre-determined mapping function with no selection logic.

Mapping functions can be created that map the logical RBG index ($I_{RBG}$) to contiguous or non-contiguous RGBs. An advantage of mapping the logical RBG index ($I_{RBG}$) to non-contiguous RBGs is that the RBGs are more likely to be spread across frequency and this provide some benefit for frequency diversity.

One mapping function that will map the logical RBG index ($I_{RBG}$) to physical RBGs is given by the relationship below:

$$I_{PRBG} = I_{RBG} * RBG_{NEED} + j \quad (5)$$

where:
j goes from 0 to ($RBG_{NEED}$−1),
$RBG_{NEED}$ is the number of RBGs needed to transmit the maximum PRBs allocated to MTC UEs, and is given by equation (2) above,
$I_{RGB}$ is the logical RGB index, and
$I_{PRGB}$ is the physical RBG index (i.e., the identity of the physical RBG to be used).

The mapping function of equation (5) maps the logical RBG index to contiguous physical RBG indices.

Another mapping function that will map the logical RBG index ($I_{RBG}$) to physical RBGs is given by the relationship below:

$$I_{PRBG} = I_{RBG} + j * RBG_{SUB} \quad (6)$$

where:
j goes from 0 to ($RBG_{NEED}$−1),
$RBG_{NEED}$ is the number of RBGs needed to transmit the maximum PRBs allocated to MTC UEs, and is given by equation (2) above,
$RBG_{SUB}$ is the total number of RBG subsets as calculated by equation (1) above,
$I_{RGB}$ is the logical RGB index, and
$I_{PRGB}$ is the physical RBG index (i.e., the identity of the physical RBG to be used).

The mapping function of equation (6) maps the logical RBG index to non-contiguous physical RBG indices.

EXAMPLES

The following represent examples of calculating the logical RBG index and then mapping the logical RBG index to physical RBGs using the different mapping functions.

Example 1

$$PRB_{max} = 15, N_{PRB} = 110$$

With $N_{PRB}=110$, $N_{RBG}=28$ and P=4 (from Table 1). Calculating $RBG_{NEED}$ from equation (2) yields:

$$RBG_{NEED} = \left\lceil \frac{PRB_{max}}{P} \right\rceil = \left\lceil \frac{15}{4} \right\rceil = 4$$

Equation (1) then gives $RBG_{SUB}$ as:

$$RBG_{SUB} = \left\lfloor \frac{N_{RBG}}{RBG_{NEED}} \right\rfloor = \left\lfloor \frac{28}{4} \right\rfloor = 7$$

For RNTI consider three UE, where UE1 has RNTI=7, UE2 has RNTI=2 and UE3 has RNTI=21. In this situation, calculating $I_{RBG}$ for each according to equation (3) yields:
UE1: $I_{RBG}$=7 mod 7=0
UE2: $I_{RBG}$=2 mod 7=2
UE3: $I_{RBG}$=21 mod 7=0

Thus, UE1 and UE3 will be mapped to the same sequence physical RBGs, since they have the same index. Applying the mapping function of equation (5) and we get the following sequence of physical RBGs.

TABLE 2

| Physical RBG Index - equation (5) | |
| --- | --- |
| UE1/UE3 ($I_{PRBG}$) | UE2 ($I_{PRBG}$) |
| 0 | 8 |
| 1 | 9 |
| 2 | 10 |
| 3 | 11 |

Applying the mapping function of equation (6) we get the following sequence of physical RBGs.

TABLE 3

| Physical RBG Index - equation (6) | |
| --- | --- |
| UE1/UE3 ($I_{PRBG}$) | UE2 ($I_{PRBG}$) |
| 0 | 2 |
| 7 | 9 |
| 14 | 16 |
| 21 | 23 |

Rather than the static RNTI for the UE, if we apply the time-varying $RNTI_k$ of equation (4) we would have the following RNTIs for the first three iterations (e.g., k=0, 1, 2):

TABLE 4

| Time varying RNTI example | | | |
| --- | --- | --- | --- |
| k | UE1: $RNTI_k$ | UE2: $RNTI_k$ | UE3: $RNTI_k$ |
| 0 | 7 | 2 | 21 |
| 1 | 16641 | 14117 | 49923 |
| 2 | 50963 | 61373 | 21815 |

Using each of these RNTIs in equation (3) gives the logical RBG index for each of the RNTI at each time metric, k, as shown in Table 5.

TABLE 5

| $I_{RBG}$ for time metric k | | | |
| --- | --- | --- | --- |
| k | UE1: $I_{RBG}$ | UE2: $I_{RBG}$ | UE3: $I_{RBG}$ |
| 0 | 0 | 2 | 0 |
| 1 | 2 | 5 | 6 |
| 2 | 3 | 4 | 3 |

The logical RBG index can then be mapped to the physical RBG indices using equation (5) or (6) as illustrated in Table 6 and Table 7 below. These tables indicates the physical RBG index ($I_{PRBG}$) for the logical RBG index ($I_{RBG}$) using equations (5) and (6), respectively. As illustrated in this example, the time varying RNTI helps reduce re-occurrences of conflicts among UEs based on RNTI.

TABLE 6

$I_{PRBG}$ vs. $I_{RBG}$ for equation (5)

| $I_{RBG}$ | $I_{PRBG}$ | | | |
|---|---|---|---|---|
| 0 | 0 | 1 | 2 | 3 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |

TABLE 7

$I_{PRBG}$ vs. $I_{RBG}$ for equation (6)

| $I_{RBG}$ | $I_{PRBG}$ | | | |
|---|---|---|---|---|
| 0 | 0 | 7 | 14 | 21 |
| 2 | 2 | 9 | 16 | 23 |
| 3 | 3 | 10 | 17 | 24 |
| 4 | 4 | 11 | 18 | 25 |
| 5 | 5 | 12 | 19 | 26 |
| 6 | 6 | 13 | 20 | 27 |

Combining the information in Table 5 with that in Table 6 or Table 7 gives the physical RBGs that will be used transmit information to UE1, UE2 and UE3 for each time step (k=0, 1 and 2). As noted before at time k=0, there will be a conflict between UE1 and UE2, which both have a logical RBG index of 0. However, at k=1, UE1 has a logical RBG index of 2, UE2 has a logical RBG index of 5 and UE3 has a logical RBG index of 6. For the mapping function in equation (5), this means that UE1 will receive information in physical RBGs 8-11. UE2 will receive information in physical RBGs 20-23 and UE3 will receive information in physical RBGs 24-27. Thus no conflict occurs for k=1 and 2. Mapping equation (6) also results in no conflict for k=1 and 2.

Returning to FIG. 4, after the mapping from logical to physical RBG index has been accomplished in operation 410 as explained above, the eNB transmits desired information during the identified physical RBGs and the method ends at 416.

Figure 5:
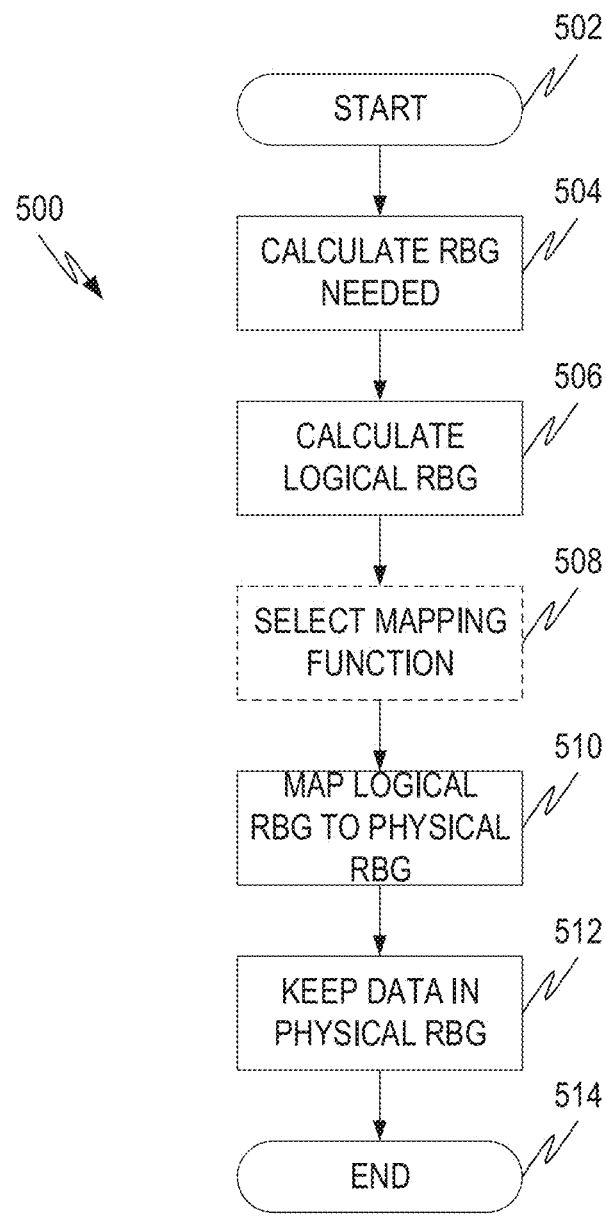
FIG. 5 illustrates an example flow diagram implemented by a UE to identify which Resource Block Groups (RBG) an eNB has used to transmit information to the UE in accordance with some embodiments.

FIG. 5 illustrates an example flow diagram 500 implemented by a UE, such as an MTC UE, to identify which RBGs an eNB has used to transmit information to the MTC UE. Since the UE is executing operations to arrive at the same selection as the eNB which sent the data, many of the operations FIG. 5 correspond to operations previously described in conjunction with FIG. 4. As such, it will not be necessary to repeat descriptions which are given above.

The flow diagram begins in operation 502 and proceeds to operation 504 where the UE calculates the number of RBG subsets ($RBG_{SUB}$) that are available for an eNB to transmit information to a MTC UE or other appropriate UE. This subset is calculated by the relationship given in equation (1) above. As descried above, this subset represents how many groups of RBGs of the length needed to transmit the maximum PRBs for an MTC UE ($RBG_{NEED}$) exist in the bandwidth. Since the ceiling operator is used in equation (1), one of the groups may be of shorter length than $RBG_{NEED}$ in some circumstances. However, the shorter group is counted as a full length for the purposes of the method.

Once the RBG subset ($RBG_{SUB}$) is calculated according to equation (1), the logical RBG index ($I_{RBG}$) is calculated according to equation (3) or (3a) depending on whether the particular embodiment adds the Cell ID the RNTI. This is illustrated in operation 506.

As described above, some embodiments use logic to select a mapping function to map the logical RBG index to a series of physical RBG indices. Operation 508 illustrates this selection. Such selection logic can operate as described in operation 408 in conjunction with FIG. 4 above.

The logical RBG index ($I_{RBG}$) is mapped to the physical RBG indices (which identify which physical RBGs to use) in operation 510. The mapping can be performed, for example, using the equations (5) or (6), depending on the embodiment.

The physical RBGs identified in operation 510 as well as any additional RBGs containing other information of interest (control information and so forth) are now known to the UE. The UE then adjusts its receiver to keep the data in the physical RBGs identified in operation 510 as well as any other RBGs of interest. Other RBGs that do not contain information of interest can be discarded. These functions are represented by operation 512.

The process of keeping only RBGs with information of interest will be performed differently in different receiver implementations. In most instances, it will depend on how the DFT and/or frequency equalization is implemented. In many implementations, information in RBGs that hold no information intended for the UE can be discarded and not stored and/or buffered. This allows UEs implementing the methodologies herein to reduce the amount of information stored and/or buffered after the DFT and/or frequency equalization because the amount of data to be retained will be lower than a receiver that has to store all possible RBGs where information of interest may reside. This, in turn, reduces the hardware requirements in terms of buffer and/or storage memory for the information.

Figure 6:
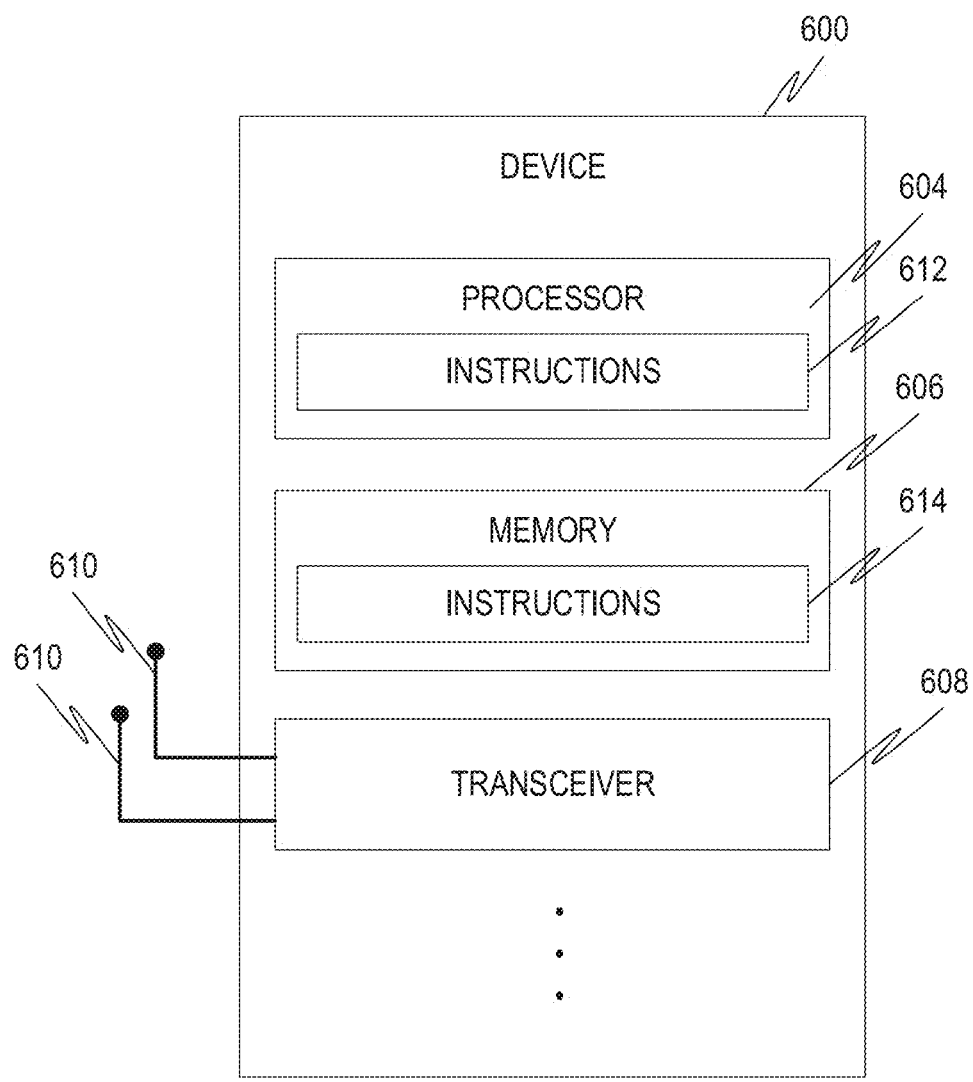
FIG. 6 illustrates a system block diagram of an example system according to some embodiments.

FIG. 6 illustrates a system block diagram of an example system according to some embodiments. FIG. 6 illustrates a block diagram of a device 600. Such a device could be, for example, an eNB such as any of the eNBs or autonomous eNBs described in FIGS. 1-5. Such a device could also be, for example, UE such as UEs described in conjunction with FIGS. 1-5.

Device 600 may include processor 604, memory 606, transceiver 608, antennas 610, instructions 612, 614, and possibly other components (not shown).

Processor 604 comprises one or more central processing units (CPUs), graphics processing units (GPUs), advanced processing units (APUs), or various combinations thereof. The processor 604 provides processing and control functionalities for device 600. Memory 606 comprises one or more memory units configured to store instructions 914 and data for device 600. The methodologies disclosed herein, such as the flow diagrams of FIGS. 4 and 5 and other functionality described herein can be implemented in software to temporarily or permanently program the processor 604 and other components of device 600 to operate in conjunction with the disclosure.

Transceiver 608 comprises one or more transceivers including, for an appropriate eNB or UE, including an MTC UE, a multiple-input and multiple-output (MIMO) antenna to support MIMO communications. For device 600, transceiver 608 receives transmissions and transmits transmissions. Transceiver 608 includes a receiver, such as that disclosed in conjunction with FIG. 2 as appropriate for an MTC UE, eNB or other UE depending on the implementation. Transceiver 608 is coupled to antennas 610, which represent an antenna or multiple antennas, as appropriate to the device.

The instructions 612, 614 comprise one or more sets of instructions or software executed on a computing device (or machine) to cause such computing device (or machine) to perform any of the methodologies discussed herein, such as the operations described in conjunction with the eNBs, MTC UE, or other UE, the flow diagrams above, and so forth. The instructions 612, 614 (also referred to as computer- or machine-executable instructions) may reside, completely or at least partially, within processor 604 and/or the memory 606 during execution thereof by device 600. While instructions 612 and 614 are illustrated as separate, they can be part of the same whole. The processor 604 and memory 606 also examples of machine-readable storage media. The various combinations of processor, memory, instructions, transceiver circuitry and so forth are representative examples of hardware processing circuitry.

In FIG. 6, processing and control functionalities are illustrated as being provided by processor 604 along with associated instructions 612 and 614. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The term "computer readable medium," and "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The following represent various example embodiments.

Example 1

An Enhanced Node B (eNB) comprising hardware processing circuitry configured to at least:

calculate a number of Resource Block Groups (RBG) subsets available within a bandwidth for the eNB to transmit information to a Machine Type Communication (MTC) User Equipment (UE);

calculate a logical RBG index for the MTC UE based on a Radio Network Temporary Identifier (RNTI) for the MTC UE and the number of RBG subsets available;

map the logical RBG index to a number of physical RBG using a mapping function; and use at least a subset of the number of physical RBG to transmit information to the MTC UE.

Example 2

The eNB of example 1, wherein the processing circuitry is further configured to select the mapping function to map the logical RBG index to the number of physical RBG from among a plurality of mapping functions.

Example 3

The eNB of examples 1 or 2, wherein the mapping function selects the number of physical RBG to be contiguous.

Example 4

The eNB of example 1 or 2, wherein the mapping function selects the number of physical RBG so at least some of the physical RBG are not contiguous.

Example 5

The eNB of example 1 or 2, wherein the mapping function is of the form:

$$\text{Index for PRB} = I_{RBG} * RBG_{NEED} + i$$

where:
  $I_{RBG}$ is the logical RBG index,
  $RBG_{NEED}$ is a number of RBG subsets needed to transmit information to the MTC UE, and
  i runs from zero to $RBG_{NEED}$ minus 1.

Example 6

The eNB of example 1 or 2, wherein the mapping function is of the form:

Index for PRB=$I_{RBG}$+$i$*$RBG_{SUB}$ where:
  $I_{RBG}$ is the logical RBG index,
  $RBG_{SUB}$ is the number of RBG subsets available within the bandwidth for the eNB to transmit information to the MTC UE, and
  i runs from zero to a number of RBG subsets needed to transmit information minus 1.

Example 7

The eNB of example 1 or 2, wherein the RNTI is a Cell Radio Network Temporary Identifier (C-RNTI).

Example 8

The eNB of example 1 or 2, wherein the RNTI is a Random Access Network Temporary Identifier (RA-RNTI).

Example 9

The eNB of example 1 or 2, wherein the RNTI is a Paging Network Temporary Identifier (P-RNTI).

Example 10

The eNB of example 1 or 2, wherein the RNTI is an output of a pseudorandom function that depends on a prior RNTI and a time metric.

Example 11

The eNB of example 10, wherein the time metric comprises at least one of: a radio frame, a subframe, or a slot.

Example 12

The eNB of example 10, wherein the RNTI is calculated using:

$RNTI_k = A * RNTI_{k-1} \mod D$ where:
  A=39827,
  D=65537, and
  k represents the time metric.

Example 13

The eNB of example 12, wherein $RNTI_k$ represents the RNTI for the kth radio frame, subframe, or slot, depending on which time metric is used.

Example 14

The eNB of example 12, wherein an initial RNTI ($RNTI_0$) is non-zero.

Example 15

A method performed by an Enhanced Node B (eNB) comprising:
  calculating a number of Resource Block Groups (RBG) subsets available within a bandwidth for the eNB to transmit information to a Machine Type Communication (MTC) User Equipment (UE);
  calculating a logical RBG index for the MTC UE based on a Radio Network Temporary Identifier (RNTI) for the MTC UE and the number of RBG subsets available;
  mapping the logical RBG index to a number of physical RBG using a mapping function; and
  using at least a subset of the number of physical RBG to transmit information to the MTC UE.

Example 16

The method of example 15, further comprising selecting the mapping function to map the logical RBG index to the number of physical RBG from among a plurality of mapping functions.

Example 17

The method of examples 15 or 16, wherein the mapping function selects the number of physical RBG to be contiguous.

Example 18

The method of example 15 or 16, wherein the mapping function selects the number of physical RBG so at least some of the physical RBG are not contiguous.

Example 19

The method of example 15 or 16, wherein the mapping function is of the form:

Index for PRB=$I_{RBG}$*$RBG_{NEED}$+$i$ where:
  $I_{RBG}$ is the logical RBG index,
  $RBG_{NEED}$ is a number of RBG subsets needed to transmit information for the identified UE, and
  i runs from zero to $RBG_{NEED}$ minus 1.

Example 20

The method of example 15 or 16, wherein the mapping function is of the form:

Index for PRB=$I_{RBG}$+$i$*$RBG_{SUB}$ where:
  $I_{RBG}$ is the logical RBG index,
  $RBG_{SUB}$ is the number of RBG subsets available within the bandwidth for the eNB to transmit information to the MTC UE, and
  i runs from zero to a number of RBG subsets needed to transmit information minus 1.

Example 21

The method of example 15 or 16, wherein the RNTI is a Cell Radio Network Temporary Identifier (C-RNTI).

Example 22

The method of example 15 or 16, wherein the RNTI is a Random Access Network Temporary Identifier (RA-RNTI).

Example 23

The method of example 15 or 16, wherein the RNTI is a Paging Network Temporary Identifier (P-RNTI).

Example 24

The method of example 15 or 16, wherein the RNTI is an output of a pseudorandom function that depends on a prior RNTI and a time metric.

Example 25

The method of example 24, wherein the time metric comprises at least one of: a radio frame, a subframe, or a slot.

Example 26

The method of example 24, wherein the RNTI is calculated using:

$$RNTI_k = A * RNTI_{k-1} \bmod D$$

where:
A=39827,
D=65537, and
k represents the time metric.

Example 27

The method of example 26, wherein $RNTI_k$ represents the RNTI for the kth radio frame, subframe, or slot, depending on which time metric is used.

Example 28

At least one computer-readable storage medium storing computer-executable instructions that, when executed by an Enhanced Node B (eNB), cause the eNB to perform actions comprising:
calculate a number of Resource Block Groups (RBG) subsets available within a bandwidth for the eNB to transmit information to a Machine Type Communication (MTC) User Equipment (UE);
calculate a logical RBG index for the MTC UE based on a Radio Network Temporary Identifier (RNTI) for the MTC UE and the number of RBG subsets available;
map the logical RBG index to a number of physical RBG using a mapping function; and
use at least a subset of the number of physical RBG to transmit information to the MTC UE.

Example 29

The computer-readable storage medium of example 28, wherein the instructions further cause the eNB to select the mapping function to map the logical RBG index to the number of physical RBG from among a plurality of mapping functions.

Example 30

The computer-readable storage medium of examples 28 or 29, wherein the mapping function selects the number of physical RBG to be contiguous.

Example 31

The computer-readable storage medium of example 28 or 29, wherein the mapping function selects the number of physical RBG so at least some of the physical RBG are not contiguous.

Example 32

The computer-readable storage medium of example 28 or 29, wherein the mapping function is of the form:

$$\text{Index for PRB} = I_{RBG} * RBG_{NEED} + i$$

where:
$I_{RBG}$ is the logical RBG index,
$RBG_{NEED}$ is a number of RBG subsets needed to transmit information for the identified UE, and
i runs from zero to $RBG_{NEED}$ minus 1.

Example 33

The computer-readable storage medium of example 28 or 29, wherein the mapping function is of the form:

$$\text{Index for PRB} = I_{RBG} + i * RBG_{SUB}$$

where:
$I_{RBG}$ is the logical RBG index,
$RBG_{SUB}$ is the number of RBG subsets available within the bandwidth for the eNB to transmit information to the MTC UE, and
i runs from zero to a number of RBG subsets needed to transmit information minus 1.

Example 34

The computer-readable storage medium of example 28 or 29, wherein the RNTI is a Cell Radio Network Temporary Identifier (C-RNTI).

Example 35

The computer-readable storage medium of example 28 or 29, wherein the RNTI is a Random Access Network Temporary Identifier (RA-RNTI).

Example 36

The computer-readable storage medium of example 28 or 29, wherein the RNTI is a Paging Network Temporary Identifier (P-RNTI).

Example 37

The computer-readable storage medium of example 28 or 29, wherein the RNTI is an output of a pseudorandom function that depends on a prior RNTI and a time metric.

Example 38

The computer-readable storage medium of example 37, wherein the time metric comprises at least one of: a radio frame, a subframe, or a slot.

Example 39

The computer-readable storage medium of example 37, wherein the RNTI is calculated using:

$$RNTI_k = A * RNTI_{k-1} \bmod D$$

where:
  A=39827,
  D=65537, and
  k represents the time metric.

Example 40

The computer-readable storage medium of example 39, wherein $RNTI_k$ represents the RNTI for the kth radio frame, subframe, or slot, depending on which time metric is used.

Example 41

The computer-readable storage medium of example 39, wherein an initial RNTI ($RNTI_0$) is non-zero.

Example 42

A Machine Type Communication (MTC) User Equipment (UE) comprising hardware processing circuitry configured to at least:
  calculate a number of Resource Block Groups (RBG) subsets available within a bandwidth for an eNB to transmit information to the MTC UE;
  calculate a logical RBG index for the MTC UE based on a Radio Network Temporary Identifier (RNTI) for the MTC UE and the number of RBG subsets available;
  map the logical RBG index to a number of physical RBG using a mapping function; and
  store information received in at least a subset of the number of physical RBG while discarding at information in at least some physical RBG outside of the number of physical RBG.

Example 43

The MTC UE of example 42, wherein the processing circuitry is further configured to select the mapping function to map the logical RBG index to the number of physical RBG from among a plurality of mapping functions.

Example 44

The MTC UE of example 42, wherein the processing circuitry is further configured to select the mapping function based on configuration from an enhanced Node B (eNB).

Example 45

The MTC UE of examples 42, 43 or 44, wherein the mapping function selects the number of physical RBG to be contiguous.

Example 46

The MTC UE of example 42, 43 or 44, wherein the mapping function selects the number of physical RBG so at least some of the physical RBG are not contiguous.

Example 47

The MTC UE of example 42, 43 or 44, wherein the mapping function is of the form:

$$\text{Index for PRB} = I_{RBG} * RBG_{NEED} + i$$

where:
  $I_{RBG}$ is the logical RBG index,
  $RBG_{NEED}$ is a number of RBG subsets needed to transmit information to the MTC UE, and
  i runs from zero to $RBG_{NEED}$ minus 1.

Example 48

The MTC UE of example 42, 43 or 44, wherein the mapping function is of the form:

$$\text{Index for PRB} = I_{RBG} + i * RBG_{SUB}$$

where:
  $I_{RBG}$ is the logical RBG index,
  $RBG_{SUB}$ is the number of RBG subsets available within the bandwidth for the eNB to transmit information to the MTC UE, and
  i runs from zero to a number of RBG subsets needed to transmit information minus 1.

Example 49

The MTC UE of example 42, 43 or 44, wherein the RNTI is a Cell Radio Network Temporary Identifier (C-RNTI).

Example 50

The MTC UE of example 42, 43 or 44, wherein the RNTI is a Random Access Network Temporary Identifier (RA-RNTI).

Example 51

The MTC UE of example 42, 43 or 44, wherein the RNTI is a Paging Network Temporary Identifier (P-RNTI).

Example 52

The MTC UE of example 42, 43 or 44, wherein the RNTI is an output of a pseudorandom function that depends on a prior RNTI and a time metric.

Example 53

The MTC UE of example 52, wherein the time metric comprises at least one of: a radio frame, a subframe, or a slot.

Example 54

The MTC UE of example 52, wherein the RNTI is calculated using:

$$RNTI_k = A * RNTI_{k-1} \bmod D$$

where:
A=39827,
D=65537, and
k represents the time metric.

Example 55

The MTC UE of example 54, wherein $RNTI_k$ represents the RNTI for the kth radio frame, subframe, or slot, depending on which time metric is used.

Example 56

The MTC UE of example 54, wherein an initial RNTI ($RNTI_0$) is non-zero.

Example 57

A method performed by a User Equipment (UE) comprising:
calculating a number of Resource Block Groups (RBG) subsets available within a bandwidth for an eNB to transmit information to the UE;
calculating a logical RBG index for the UE based on a Radio Network Temporary Identifier (RNTI) for the UE and the number of RBG subsets available;
mapping the logical RBG index to a number of physical RBG using a mapping function; and
storing information received in at least a subset of the number of physical RBG while discarding at information in at least some physical RBG outside of the number of physical RBG.

Example 58

The method of example 57, further comprising selecting the mapping function to map the logical RBG index to the number of physical RBG from among a plurality of mapping functions.

Example 59

The method of example 57, further comprising selecting the mapping function based on configuration from an enhanced Node B (eNB).

Example 60

The method of examples 57, 58 or 59, wherein the mapping function selects the number of physical RBG to be contiguous.

Example 61

The method of example 57, 58 or 59, wherein the mapping function selects the number of physical RBG so at least some of the physical RBG are not contiguous.

Example 62

The method of example 57, 58 or 59, wherein the mapping function is of the form:

Index for PRB=$I_{RBG}$*$RBG_{NEED}$+i where:
$I_{RBG}$ is the logical RBG index,
$RBG_{NEED}$ is a number of RBG subsets needed to transmit information for the identified UE, and
i runs from zero to $RBG_{NEED}$ minus 1.

Example 63

The method of example 57, 58 or 59, wherein the mapping function is of the form:

Index for PRB=$I_{RBG}$+i*$RBG_{SUB}$ where:
$I_{RBG}$ is the logical RBG index,
$RBG_{SUB}$ is the number of RBG subsets available within the bandwidth for the eNB to transmit information to the UE, and
i runs from zero to a number of RBG subsets needed to transmit information minus 1.

Example 64

The method of example 57, 58 or 59, wherein the RNTI is a Cell Radio Network Temporary Identifier (C-RNTI).

Example 65

The method of example 57, 58 or 59, wherein the RNTI is a Random Access Network Temporary Identifier (RA-RNTI).

Example 66

The method of example 57, 58 or 59, wherein the RNTI is a Paging Network Temporary Identifier (P-RNTI).

Example 67

The method of example 57, 58 or 59, wherein the RNTI is an output of a pseudorandom function that depends on a prior RNTI and a time metric.

Example 68

The method of example 67, wherein the time metric comprises at least one of: a radio frame, a subframe, or a slot.

Example 69

The method of example 67, wherein the RNTI is calculated using:

$RNTI_k = A*RNTI_{k-1} \mod D$ where:
A=39827,
D=65537, and
k represents the time metric.

Example 70

The method of example 69, wherein $RNTI_k$ represents the RNTI for the kth radio frame, subframe, or slot, depending on which time metric is used.

Example 71

The method of example 69, wherein an initial RNTI ($RNTI_0$) is non-zero.

Example 72

At least one computer-readable storage medium storing computer-executable instructions that, when executed by device, cause the device to perform actions comprising:

calculate a number of Resource Block Groups (RBG) subsets available within a bandwidth for an eNB to transmit information to a Machine Type Communication (MTC) User Equipment (UE);

calculate a logical RBG index for the MTC UE based on a Radio Network Temporary Identifier (RNTI) for the MTC UE and the number of RBG subsets available;

map the logical RBG index to a number of physical RBG using a mapping function; and store information received in at least a subset of the number of physical RBG while discarding at information in at least some physical RBG outside of the number of physical RBG.

Example 73

The computer-readable storage medium of example 72, wherein the instructions further cause the device to select the mapping function to map the logical RBG index to the number of physical RBG from among a plurality of mapping functions.

Example 74

The computer-readable storage medium of example 72, wherein the instructions further cause the device to select the mapping function based on configuration from an enhanced Node B (eNB).

Example 75

The computer-readable storage medium of examples 72, 73 or 74, wherein the mapping function selects the number of physical RBG to be contiguous.

Example 76

The computer-readable storage medium of example 72, 73 or 74, wherein the mapping function selects the number of physical RBG so at least some of the physical RBG are not contiguous.

Example 77

The computer-readable storage medium of example 72, 73 or 74, wherein the mapping function is of the form:

Index for PRB=$I_{RBG}*RBG_{NEED}+i$ where:
$I_{RBG}$ is the logical RBG index,
$RBG_{NEED}$ is a number of RBG subsets needed to transmit information for the MTC UE, and
i runs from zero to $RBG_{NEED}$ minus 1.

Example 78

The computer-readable storage medium of example 72, 73 or 74, wherein the mapping function is of the form:

Index for PRB=$I_{RBG}+i*RBG_{SUB}$ where:
$I_{RBG}$ is the logical RBG index,
$RBG_{SUB}$ is the number of RBG subsets available within the bandwidth for the eNB to transmit information to the MTC UE, and
i runs from zero to a number of RBG subsets needed to transmit information minus 1.

Example 79

The computer-readable storage medium of example 72, 73 or 74, wherein the RNTI is a Cell Radio Network Temporary Identifier (C-RNTI).

Example 80

The computer-readable storage medium of example 72, 73 or 74, wherein the RNTI is a Random Access Network Temporary Identifier (RA-RNTI).

Example 81

The computer-readable storage medium of example 72, 73 or 74, wherein the RNTI is a Paging Network Temporary Identifier (P-RNTI).

Example 82

The computer-readable storage medium of example 72, 73 or 74, wherein the RNTI is an output of a pseudorandom function that depends on a prior RNTI and a time metric.

Example 83

The computer-readable storage medium of example 82, wherein the time metric comprises at least one of: a radio frame, a subframe, or a slot.

Example 84

The computer-readable storage medium of example 82, wherein the RNTI is calculated using:

$RNTI_k=A*RNTI_{k-1} \mod D$ where:
A=39827,
D=65537, and
k represents the time metric.

Example 85

The computer-readable storage medium of example 84, wherein $RNTI_k$ represents the RNTI for the kth radio frame, subframe, or slot, depending on which time metric is used.

Example 86

The computer-readable storage medium of example 84, wherein an initial RNTI ($RNTI_0$) is non-zero.

Example 87

A device comprising:
at least one antenna;
transceiver circuitry coupled to the at least one antenna;
memory;
a processor coupled to the memory and transceiver circuitry; and
instructions, stored in the memory, which when executed cause the device to perform operations comprising:
calculate a number of Resource Block Groups (RBG) subsets available within a bandwidth for an eNB to transmit information to a Machine Type Communication (MTC) User Equipment (UE);

calculate a logical RBG index for the MTC UE based on a Radio Network Temporary Identifier (RNTI) for the MTC UE and the number of RBG subsets available;

map the logical RBG index to a number of physical RBG using a mapping function; and store information received in at least a subset of the number of physical RBG while discarding at information in at least some physical RBG outside of the number of physical RBG.

What is claimed is:

1. An Enhanced Node B (eNB) comprising hardware processing circuitry configured to:
   calculate a number of Resource Block Groups (RBG) subsets available within a bandwidth for the eNB to transmit information to a Machine Type Communication (MTC) User Equipment (UE);
   calculate a logical RBG index for the MTC UE based on a Radio Network Temporary Identifier (RNTI) for the MTC UE and the number of RBG subsets available;
   map the logical RBG index to a number of physical RBG using a mapping function; and
   use at least a subset of the number of physical RBG to transmit information to the MTC UE.

2. The eNB of claim 1, wherein the processing circuitry is further configured to select the mapping function to map the logical RBG index to the number of physical RBG from among a plurality of mapping functions.

3. The eNB of claims 1, wherein the mapping function selects the number of physical RBG to be contiguous.

4. The eNB of claim 1, wherein the mapping function selects the number of physical RBG so at least some of the physical RBG are not contiguous.

5. The eNB of claim 1, wherein the mapping function is of the form:

$$\text{Index for PRB} = I_{RBG} * RBG_{NEED} + i \text{ where:}$$

$I_{RBG}$ is the logical RBG index,
$RBG_{NEED}$ is a number of RBG subsets needed to transmit information to the MTC UE, and
i runs from zero to $RBG_{NEED}$ minus 1.

6. The eNB of claim 1, wherein the mapping function is of the form:

$$\text{Index for PRB} = I_{RBG} + i * RBG_{SUB} \text{ where:}$$

$I_{RBG}$ is the logical RBG index,
$RBG_{SUB}$ is the number of RBG subsets available within the bandwidth for the eNB to transmit information to the MTC UE, and
i runs from zero to a number of RBG subsets needed to transmit information minus 1.

7. The eNB of claim 1, wherein the RNTI comprises one or more of:
   a Cell Radio Network Temporary Identifier (C-RNTI);
   a Random Access Network Temporary Identifier (RA-RNTI);
   a Paging Network Temporary Identifier (P-RNTI);
   or a time varying RNTI that varies based on a time metric.

8. The eNB of claim 7, wherein the time metric comprises at least one of:
   a radio frame, a subframe, or a slot.

9. The eNB of claim 7, wherein the time varying RNTI is an output of a pseudorandom function that depends on a prior RNTI and the time metric.

10. The eNB of claim 9, wherein the time metric comprises at least one of:
    a radio frame, a subframe, or a slot.

11. The eNB of claim 7, wherein the time varying RNTI is calculated using:

$$RNTI_k = A * RNTI_{k-1} \mod D \text{ where:}$$

A=39827,
D=65537, and
k represents the time metric.

12. The eNB of claim 11, wherein $RNTI_k$ represents the RNTI for the kth radio frame, subframe, or slot, depending on which time metric is used and $RNTI_0$ is non-zero.

13. The eNB of claim 1, further comprising an antenna to transmit and/or receive signals and wherein the hardware processing circuitry comprises a transceiver coupled to the antenna.

14. A method performed by an Enhanced Node B (eNB) comprising:
    calculating a number of Resource Block Groups (RBG) subsets available within a bandwidth for the eNB to transmit information to a Machine Type Communication (MTC) User Equipment (UE);
    calculating a logical RBG index for the MTC UE based on a Radio Network Temporary Identifier (RNTI) for the MTC UE and the number of RBG subsets available;
    selecting a mapping function from among a plurality of mapping functions;
    mapping the logical RBG index to a number of physical RBG using the mapping function; and
    using at least a subset of the number of physical RBG to transmit information to the MTC UE.

15. The method of claim 14, wherein the mapping function selects the number of physical RBG to be contiguous.

16. The method of claim 14, wherein the mapping function selects the number of physical RBG so at least some of the physical RBG are not contiguous.

17. The method of claim 14, wherein the RNTI comprises one or more of:
    a Cell Radio Network Temporary Identifier (C-RNTI);
    a Random Access Network Temporary Identifier (RA-RNTI);
    a Paging Network Temporary Identifier (P-RNTI);
    or a time varying RNTI that varies based on a time metric comprising at least one of a radio frame, a subframe, or a slot.

18. The method of claim 17 wherein the time varying RNTI is an output of a pseudorandom function that depends on a prior RNTI and the time metric.

19. A User Equipment (UE) comprising hardware processing circuitry configured to:
    calculate a number of Resource Block Groups (RBG) subsets available within a bandwidth for an eNB to transmit information to the UE;
    calculate a logical RBG index for the UE based on a Radio Network Temporary Identifier (RNTI) for the UE and the number of RBG subsets available;
    map the logical RBG index to a number of physical RBG using a mapping function;
    use at least a subset of the number of physical RBG to receive information from the eNB; and
    store the information received in the at least a subset of the number of physical RBG while discarding at information in at least some physical RBG outside of the number of physical RBG.

20. The UE of claim 19, wherein the processing circuitry is further configured to select the mapping function to map the logical RBG index to the number of physical RBG from among a plurality of mapping functions.

21. The UE of claim 19, wherein the processing circuitry is further configured to select the mapping function based on configuration from an enhanced Node B (eNB).

22. The UE of claims 19, wherein the mapping function selects the number of physical RBG to be contiguous.

23. The UE of claim 19, wherein the mapping function selects the number of physical RBG so at least some of the physical RBG are not contiguous.

24. The UE of claim 19, wherein the RNTI comprises one or more of:
  a Cell Radio Network Temporary Identifier (C-RNTI);
  a Random Access Network Temporary Identifier (RA-RNTI);
  a Paging Network Temporary Identifier (P-RNTI);
  or a time varying RNTI that varies based on a time metric comprising at least one of a radio frame, a subframe, or a slot.

25. The UE of claim 19 further comprising at least one antenna to transmit and/or receive signals and wherein the hardware processing circuitry comprises a transceiver coupled to the at least one antenna.

26. At least one computer-readable storage medium storing computer-executable instructions that, when executed by a device, cause the device to perform actions comprising:
  calculate a number of Resource Block Groups (RBG) subsets available within a bandwidth for an eNB to transmit information to the UE;
  calculate a logical RBG index for the UE based on a Radio Network Temporary Identifier (RNTI) for the UE and the number of RBG subsets available;
  select a mapping function to map the logical RBG index to a number of physical RBG so the physical RBG are either contiguous or at least partially non-contiguous;
  map the logical RBG index to the number of physical RBG using the mapping function;
  use at least a subset of the number of physical RBG to receive information from the eNB; and
  store the information received in the at least a subset of the number of physical RBG while discarding at information in at least some physical RBG outside of the number of physical RBG.

27. The at least one computer-readable storage media of claim 26 further comprising instructions that, when executed by the device, cause the device to further select the mapping function based on configuration information received from an eNB.

* * * * *